Nov. 11, 1969  E. F. H. B. HILLIER  3,477,867
GASKET ASSEMBLIES

Filed Aug. 25, 1965  3 Sheets-Sheet 1

INVENTOR
EDWARD F. H. B. HILLIER
BY
Arland M. Christensen
ATTORNEY

Nov. 11, 1969   E. F. H. B. HILLIER   3,477,867
GASKET ASSEMBLIES

Filed Aug. 25, 1965   3 Sheets-Sheet 2

INVENTOR
EDWARD F.H.B. HILLIER
BY
Orland M. Christensen
ATTORNEY

Nov. 11, 1969     E. F. H. B. HILLIER     3,477,867
GASKET ASSEMBLIES

Filed Aug. 25, 1965     3 Sheets-Sheet 3

INVENTOR
EDWARD F.H.B. HILLIER
BY

Arland M. Christensen
ATTORNEY

United States Patent Office 3,477,867
Patented Nov. 11, 1969

3,477,867
GASKET ASSEMBLIES
Edward F. H. B. Hillier, Cheltenham, England, assignor to Dowty Seals Limited
Filed Aug. 25, 1965, Ser. No. 482,568
Claims priority, application Great Britain, Aug. 28, 1964, 35,300/64
Int. Cl. B41k 3/68; B41m 3/00
U.S. Cl. 117—4                14 Claims

ABSTRACT OF THE DISCLOSURE

The invention is directed to a process of making gasket assemblies whereby annular layers of sealing material are deposited in such a manner that each layer surrounds an aperture in the support member. Multiple layers of sealing material may be deposited by screen printing a curable rubber resin, in situ, over the apertured area.

---

This invention relates to a method of making an apertured face-to-face seal or gasket assembly for use between a pair of interconnected components having ports therein which terminate at a connecting interface between the components.

In a screen printing process, the printing medium passes through a screen onto the receiving material, the deposit of the printing medium on the receiving material being controlled by a stencil which is usually located between the screen and the receiving material and is usually secured to the screen. The printing medium is usually forced through the screen onto the receiving material by an implement known as a squeegee during relative movement between the squeegee on the one hand and the screen, stencil and receiving material on the other hand.

According to the present invention, a method of making a gasket assembly includes depositing an annular layer of sealing material on a face of a support member by a screen printing process and, either before or after depositing the annular layer, forming an aperture in the support member such that the annular layer surrounds the aperture. Alternatively, the annular layer may be deposited by a screen-printing process on a transfer member and then transferred to the support member.

This method of making such gasket assemblies has considerable economic and technical advantages over known methods of making gasket assemblies. For example, virtually no sealing material is wasted and the necessary manufacturing equipment is relatively inexpensive.

A plurality of annular layers of sealing material may be so deposited such that each annular layer surrounds a different one of a plurality of apertures in the face of the support member. A further annular layer of sealing material may be deposited on the first annular layer or on at least one of the first annular layers. The annular layers may vary in thickness, and may vary in width.

The sealing material may be of a rubber-like nature in that the material has to be cured after it has been deposited on or transferred to the support member. While initial curing or setting is taking place, the annular layer may be compressed in a convenient manner such that the free surface of the annular layer is afterwards smoother and flatter than it would otherwise have been. The compression may be such that the sealing material is slightly extruded during the curing and in this way the thickness of the or an annular layer can be adjusted to a predetermined value. Such compression can also be used to produce an annular layer of varying thickness.

Each aperture in the said face of the support member may communicate with an aperture in another face of the support member, an annular layer of sealing material being deposited on or transferred to said other face around each aperture therein.

There are many suitable sealing materials, for example, acrylonitrile rubbers and silicone rubbers. These may require a suitable solvent and may contain fillers and/or binders. A bonding agent may be necessary to obtain adequate adherence of the sealing material to the support member. The support member may be of any suitable material, for example a suitable metal or synthetic plastic material, as may the transfer member when one is used. The transfer member may be coated with a release agent to facilitate removal of the annular layer or layers of sealing material.

Embodiments of the present invention will now be described, by way of example, with reference to the accompanying drawings, of which, FIGURE 1 is a plan view of a gasket assembly according to one embodiment, FIGURE 2 is a plan view of a gasket assembly along the line 2—2 of FIGURE 1, FIGURES 3 and 4 are perspective views of gasket assemblies according to further embodiments, FIGURE 5 is a sectional view of part of a gasket assembly according to another embodiment, FIGURE 6 is a plan view of a gasket assembly according to a further embodiment, FIGURE 7 is a sectional view along the line 7—7 of FIGURE 6, FIGURE 8 is a plan view of a gasket assembly according to another embodiment, FIGURE 9 is a sectional view along the line 9—9 of FIGURE 8, FIGURE 10 is a sectional view of a gasket assembly according to another embodiment, FIGURE 11 is a sectional view along the line 11—11 of FIGURE 10, FIGURE 12 is a plan view of a gasket assembly according to a further embodiment, FIGURES 13 and 14 show ways of compressing the sealing material during curing, FIGURE 15 shows shaping plates for shaping during compression, FIGURE 16 shows a gasket assembly before compression, FIGURE 17 shows the gasket assembly of FIGURE 16 being compressed by the shaping plates of FIGURE 15, FIGURE 18 shows the gasket assembly after shaping, and FIGURE 19 shows another way of shaping during compression.

Referring to the accompanying drawings, FIGURES 1 and 2 show a gasket assembly including a support member 1 formed as a sheet with three apertures 2 of different sizes and shapes extending from one face to the other. Annular layers 3 of sealing material have been deposited on or transferred to both faces of the support member 1 such that each annular layer 3 surrounds an aperture 2. This gasket assembly is intended for use between two components which have ports in positions corresponding to the positions of the apertures 2, and the gasket assembly has bolt holes 4 through which bolts to secure the components together will pass.

The sealing material is present in annular layers 3 surrounding each aperture 2. This represents a considerable saving of sealing material over known gasket assemblies prepared by other methods in which the sealing material covers the face of the support member, and also produces a gasket assembly having better sealing properties than known gasket assemblies of comparable cost.

Figure 1:
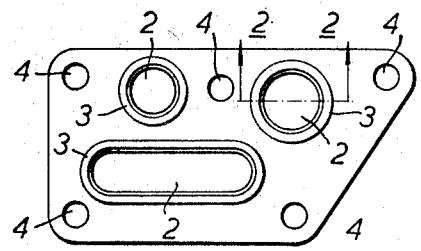
Figure 2:
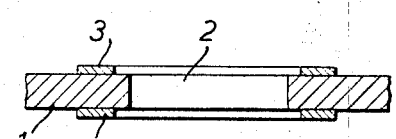
Figure 3:
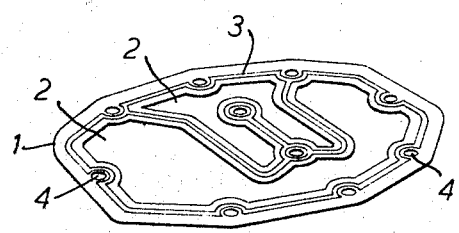
FIGURE 3 shows another gasket assembly and the same reference numerals have been used to indicate similar parts.
Figure 4:
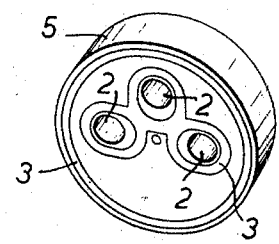
FIGURE 4 shows a gasket assembly in which the sealing material has been deposited on the face of a component 5 rather than on a sheet to be inserted between two components.
Figure 5:
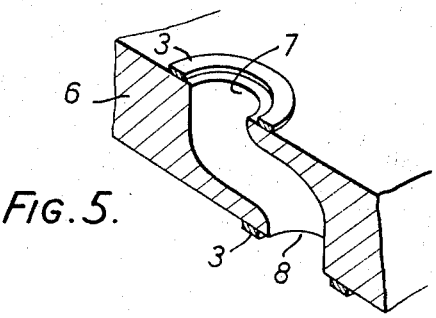
FIGURE 5 shows a gasket assembly in which the support member 6 has apertures 7, 8 in opposed faces which communicate with one another, but are not aligned with one another.
Figure 6:
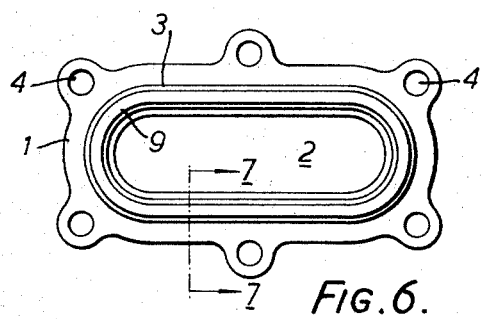
Figure 7:
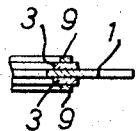

FIGURES 6 and 7 show a gasket assembly in which a further annular layer 9 of sealing material has been deposited on or transferred to each first annular layer 3, the further annular layers 9 having less width than the first annular layers 3.

Figures 8, 9:
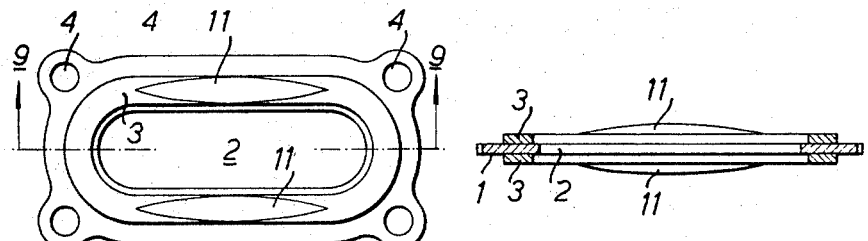

FIGURES 8 and 9 show a gasket assembly in which a further portion 11 of sealing material has been deposited on or transferred to each first annular layer 3. Each further portion 11 varies in thickness, this variation being produced by variation in thickness of the stencil during the screen printing process, or by shaping during curing as will be described later.

Figures 10, 11:

FIGURES 10 and 11 show a gasket assembly in which the annular layers 3 vary in thickness.

Figure 12:
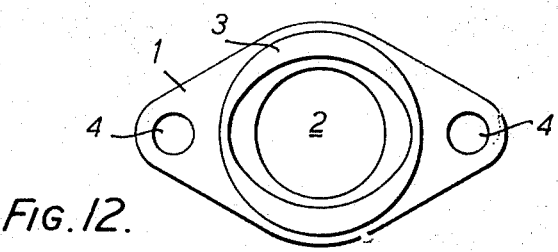

FIGURE 12 shows a gasket assembly in which the annular layer 3 varies in width, being narrowest nearest two bolt holes 4. When such a gasket assembly is bolted between two components, the resilient small amount of bowing of each component is accommodated without losing adequate sealing properties.

Figure 13:
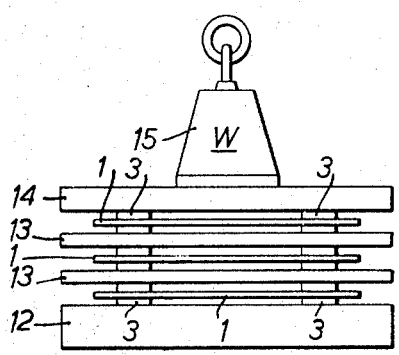

FIGURE 13 shows one way of compressing the annular layers 3 of three gasket assemblies during curing, with a base 12, separators 13, a top 14 and a weight 15. In this case, the weight is sufficient to produce a free surface of each annular layer 3 which is smoother and flatter than it would be if there was no compression.

Figure 14:
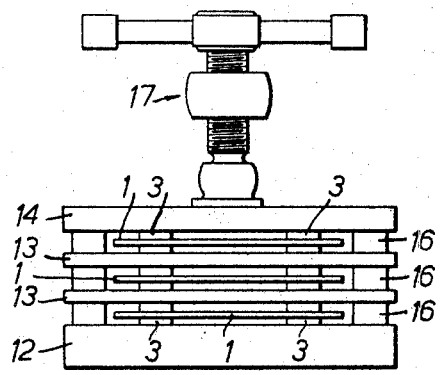

FIGURE 14 shows another way of compressing the annular layers during curing, with spacers 16 and a screw clamp 17. The spacers 16 have a predetermined thickness to determine the final thickness of the annular layers 3.

Figure 15:
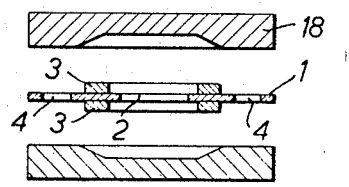
Figure 16:
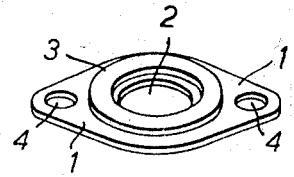
Figure 17:
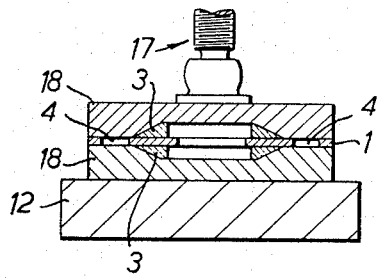
Figure 18:
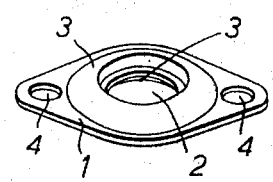

FIGURE 15 shows two clamping plates 18 which are so shaped that, when a gasket assembly such as is shown in FIGURE 16 is compressed during curing in the manner shown by way of example in FIGURE 17, the annular layers 3 vary in thickness from a maximum value at their inner periphery to a minimum value at their outer peripheries.

Figure 19:
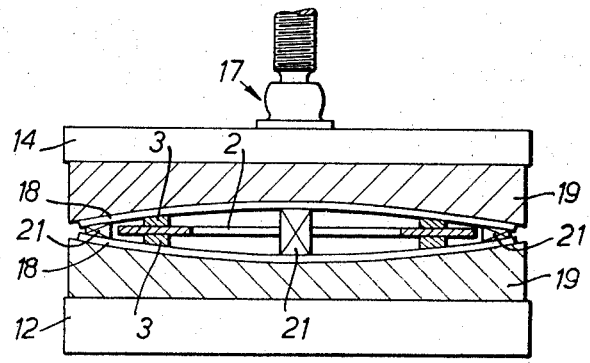

FIGURE 19 shows another manner of compressing during curing. The gasket assembly is located between two thin metal plates 18, and a resilient pad 19 is located between each plate 18 and the base 12 and top 14 respectively. Spacers 21 of different thickness are located between the plates 18 and determine the final thickness of the annular layers 3.

Thus the use of a screen printing process in the production of gasket assemblies in which one or more annular layers of sealing material are deposited or transferred to a face of a support member such that each annular layer surrounds an aperture in the face of the member, enables gasket assemblies to be produced with a variety of shapes and properties.

I claim:

1. In the manufacture of an apertured face-to-face seal to be sandwiched between a pair of interconnected components having ports therein which terminate at a connecting interface between the components, the steps of providing a flat-surfaced sheet of gasket material adapted to be inserted and compressed between the components at the interface therebetween, and having an aperture therein adapted to be interposed between the ports in the components, to provide intercommunication therebetween, and utilizing the screen printing process to print a curable liquid sealant material onto one face of the sheet, in direct faying contact with the flat surface thereof, in the area relatively immediately surrounding the edge of the aperture, while stenciling off an area of said surface between the printed area and the edge of the sheet, so that after setting the sealant material forms a raised deposit about the aperture which has a smaller area than the interface between the components.

2. The process according to claim 1 wherein the aperture is formed in the sheet after the sealant material is printed onto the face thereof.

3. The process according to claim 1 wherein the sheet also has apertures in the area thereof stenciled off between the printed area and the edge of the sheet.

4. The process according to claim 1 wherein the deposit is formed by the application of two or more layers of the sealant material, each of which layers is set before the next is applied.

5. The process according to claim 4 wherein the layers have different widths when set.

6. The process according to claim 4 wherein the layers have different thicknesses when set.

7. The process according to claim 1 wherein the deposit is subjected to compression while setting.

8. The process according to claim 1 wherein the deposit has a varying thickness and/or width from one point to another thereon when set.

9. The process according to claim 8 wherein the variation in thickness and/or width of the deposit is achieved by varying the thickness and/or width of the openings in the stencil.

10. The process according to claim 8 wherein the variation in thickness and/or width of the deposit is achieved by compressing one or more points thereon while the sealant is setting.

11. The process according to claim 1 wherein the deposit has a continuous annular form about the aperture.

12. The process according to claim 1 wherein the sealant material is a rubber resin.

13. The process according to claim 12 wherein the rubber is an acrylonitrile or silicone rubber.

14. The process according to claim 1 wherein the gasket material is a metal material.

References Cited

UNITED STATES PATENTS

| | | | |
|---|---|---|---|
| 3,131,081 | 4/1964 | Husum | 117—38 X |
| 2,516,647 | 7/1950 | Rogers et al. | 117—38 |
| 2,502,926 | 4/1950 | Chadwick et al. | 117—38 X |
| 2,720,406 | 10/1955 | Balfe | 277—235 X |
| 2,289,620 | 7/1942 | Bernstein | 277—235 |
| 2,055,103 | 9/1936 | Hewitt | 277—235 |

ALFRED L. LEAVITT, Primary Examiner

ALAN GRIMALDI, Assistant Examiner

U.S. Cl. X.R.

117—38; 156—277, 280, 306; 161—109, 115; 277—235